US008522148B1

(12) United States Patent
Pry

(10) Patent No.: US 8,522,148 B1
(45) Date of Patent: Aug. 27, 2013

(54) SYSTEM FOR ORGANIZATION, DISPLAY, AND NAVIGATION OF SITE INFORMATION

(75) Inventor: Matthew Pry, Bucyrus, OH (US)

(73) Assignee: Pran, Cho & Shici PTE., LLC, Wilimington, DC (US)

( * ) Notice: Subject to any disclaimer, the term of this patent is extended or adjusted under 35 U.S.C. 154(b) by 801 days.

(21) Appl. No.: 12/619,627

(22) Filed: Nov. 16, 2009

Related U.S. Application Data

(63) Continuation-in-part of application No. 12/131,690, filed on Jun. 2, 2008, now Pat. No. 7,627,826, which is a continuation of application No. 10/940,290, filed on Sep. 13, 2004, now Pat. No. 7,383,510.

(51) Int. Cl.
G06F 3/00 (2006.01)
G06F 3/048 (2006.01)

(52) U.S. Cl.
USPC ............................ 715/745; 715/838; 715/854

(58) Field of Classification Search
USPC .................................. 715/738, 745, 838, 854
See application file for complete search history.

(56) References Cited

U.S. PATENT DOCUMENTS

| | | | |
|---|---|---|---|
| 6,070,176 A | 5/2000 | Downs et al. | |
| 6,271,840 B1 | 8/2001 | Finseth et al. | |
| 6,275,829 B1 | 8/2001 | Angiulo et al. | |
| 6,356,908 B1 | 3/2002 | Brown et al. | |
| 6,513,035 B1 | 1/2003 | Tanaka et al. | |
| 6,643,641 B1 | 11/2003 | Snyder | |
| 2003/0014415 A1 | 1/2003 | Weiss et al. | |
| 2003/0197724 A1* | 10/2003 | Reed | 345/738 |
| 2004/0001104 A1* | 1/2004 | Sommerer et al. | 345/811 |
| 2005/0132018 A1 | 6/2005 | Milic-Frayling et al. | |
| 2005/0257400 A1 | 11/2005 | Sommerer et al. | |

FOREIGN PATENT DOCUMENTS

WO 2006031549 3/2006

OTHER PUBLICATIONS

Smartdevil, "Thumbshots," Millions of Web Surfers Flocking for Thumbshot Previews, pp. 1-2 Feb. 11, 2004, http//www.smartdevil.com/corporate/press/20040211-1.pxf.
Dmoz, open directory project, "Previews by Thumbshots.TM.," Top: Recreation: Pets: Dogs: Breeds: Terrier Group: West Highland White Terrier, pp. 1-3, Sep. 5, 2003, three pages, http://open.thumbshots.org/Recreation/:ets/Dogs/Breeds/Terrier_Group/West_Highland_W....
Smartdevil, "Thumbshots," Free Thumbshots for DMOZ Directory, pp. 1-2, Mar. 5, 2004, two pages, http://thumbshots.org.
International Search Report for PCT/US05/031800; Mailing date Jun. 17, 2008.
Stolowitz Ford Cowger Listing of Related Cases; Aug. 29, 2010.

* cited by examiner

*Primary Examiner* — Weilun Lo
*Assistant Examiner* — Truc Chuong
(74) *Attorney, Agent, or Firm* — Stolowitz Ford Cowger LLP

(57) ABSTRACT

A system and method for the organization, display, and navigation of digital information. The system and method allow for easy navigation of primary search results responsive to a search request, as well as navigation of secondary information related to the primary search results. In an example embodiment, primary search results are displayed as web page images. A user may select an image from the primary search results and view the web page in an operational window. Information from a web site associated with the selected page is used to populate a site item area of the screen comprising items from the web site responsive to the search criteria. When an item is selected from the site item area, information related to the item is displayed to the user. Selected items are used to populate an item history area while selected web pages are used to populate a search history area.

37 Claims, 11 Drawing Sheets

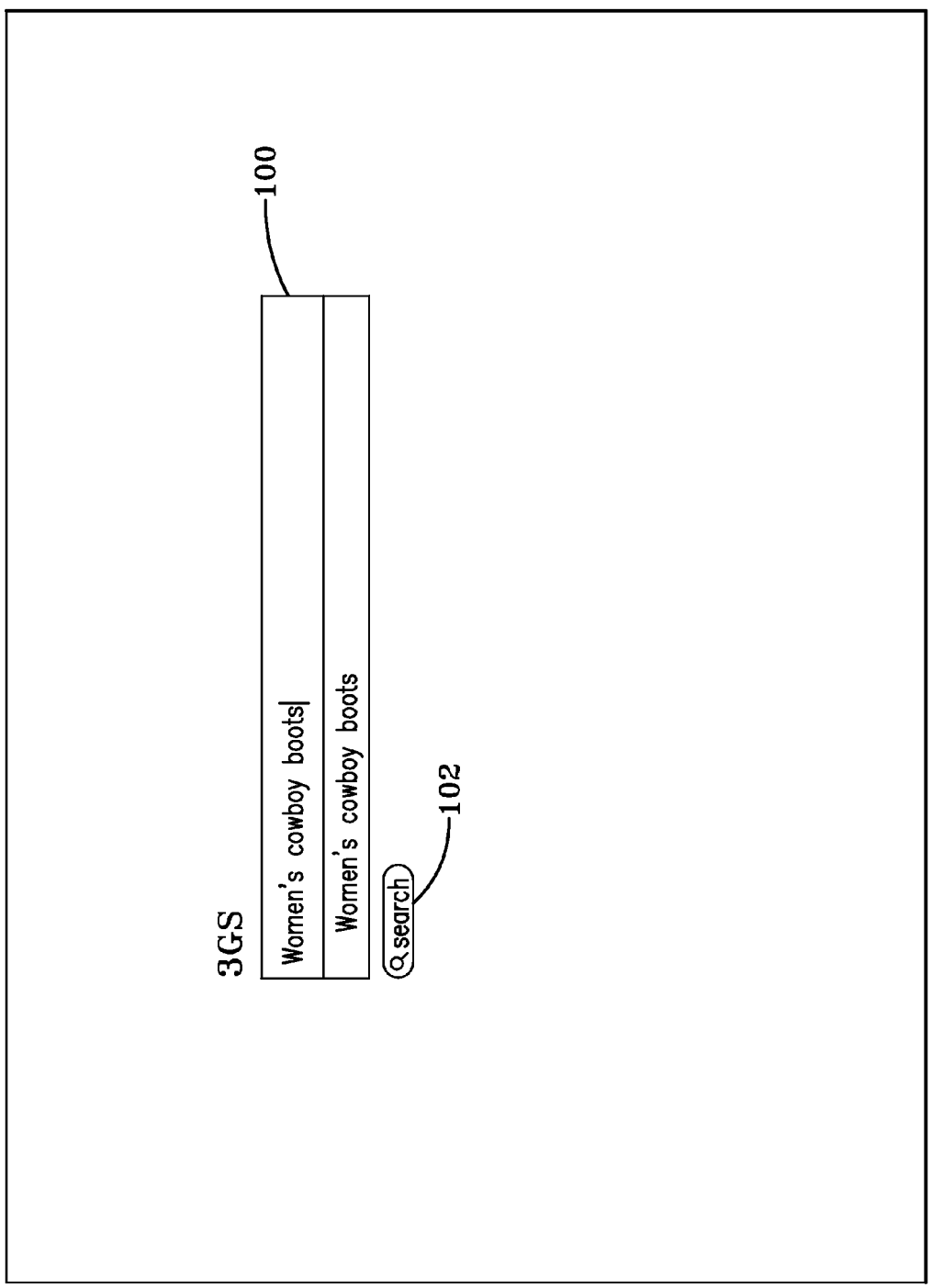

FIG-3C

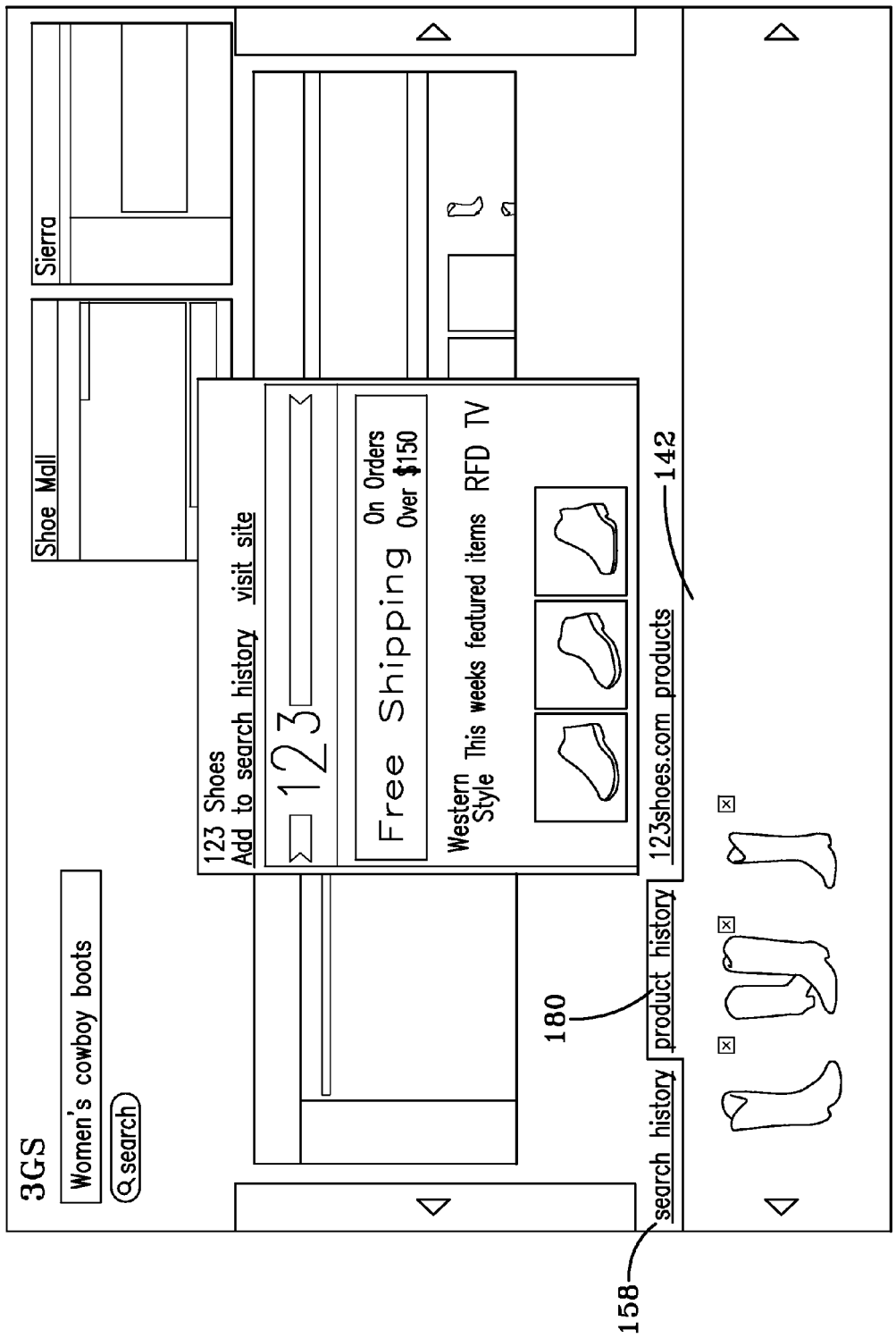

SYSTEM FOR ORGANIZATION, DISPLAY, AND NAVIGATION OF SITE INFORMATION

CROSS-REFERENCES TO RELATED APPLICATIONS

This application is a continuation-in-part of U.S. application Ser. No. 12/131,690, filed Jun. 2, 2008 and entitled SYSTEM FOR ORGANIZATION, DISPLAY, AND NAVIGATION OF DIGITAL INFORMATION, which is a continuation of U.S. application Ser. No. 10/940,290 filed Sep. 13, 2004 and entitled SYSTEM FOR ORGANIZATION, DISPLAY, AND NAVIGATION OF DIGITAL INFORMATION, now U.S. Pat. No. 7,383,510, issued Jun. 3, 2008 both of which are hereby incorporated by reference as if fully recited herein.

FIELD OF INVENTION

The present invention relates generally to systems and methods for the organizing, displaying, and navigating digital information. In particular, the disclosed system and method allows for the easy navigation of sites that offer products or other items, as well as the navigation of information embedded in primary product or item information sources.

BACKGROUND OF THE INVENTION

A web based search engine is a common tool employed by users of the Internet to find and explore web based content. A user enters search terms into a search engine, and the search engine finds relevant web pages based upon the specified criteria. Once the relevant web pages are found, the search engine displays the search results to the user. Typically, the user is provided with a list of links to web pages with relevant information and text based excerpts of the content at the linked web page. A second method of displaying search engine results uses "thumbnail" images of the content of individual web pages, displayed in conjunction with the link to the web page and associated text excerpt. A thumbnail image of web page content is a miniaturized picture of content from the HTML page at the corresponding URL.

Shopping sites in particular tend to make substantial use of images of products identified in search requests. Some shopping sites present a display in which images of products matching the user's search request are listed in a static format. To the right of each image is a link to a product purchase page for the identified item. The price of the product is then displayed to the right of the link. Some sites further display below the item price a rating for the merchant offering the product. The user is typically provided with options for sorting the search results such as sorting by relevance, sorting by price (low to high), sorting by price (high to low), etc.

Regardless of the specific display format for the product search results, the search results do not necessarily present what the user really wants. Although the shopping site may provide the user with what are believed to be the items most relevant to the search request, the user is typically presented with one or two items from each merchant represented in the search results. To determine whether a particular merchant has additional items that may be of interest, the computer user must leave the search results page and navigate the merchant's web site to find additional items. Typically, the user must enter a new search request at the merchant's site to find the additional items. The search results are presented in a format particular to the merchant's site and the user may be required to further navigate the merchant's search results to actually find items of interest. The user must then complete this process for every merchant that may have items of interest.

Another problem with shopping and other search sites that display images of items matching the search terms is that they do not develop a complete history of the user's session. To assist users with remembering what they viewed while at the shopping or search site, the sites typically create a history of "recently viewed" items from items that the user selected from the search results. When the user leaves the shopping site to view other products or items from other web sites identified in the search results, the shopping or search site's tracking features and functionality are no longer operational. A merchant's site may provide a "recently viewed" feature and maintain a list of items similar to the shopping site "recently viewed" list but the merchant's list is independent of the shopping/search site list. Once the user leaves the merchant's site, the "recently viewed" list disappears. The user's browser may track the user's navigation at the merchant site, but it typically records every page that the user viewed rather than the specific items that the user viewed.

Shopping sites and other search sites that display images of items relevant to a user's query limit a user's ability to find and purchase or otherwise select the item or items they really want. First, they typically select only a few items from each of the sites that may have relevant items. Second, they do not facilitate transitions from the shopping site to the merchant sites that may have many more items of interest than the ones appearing in the results list. The sites also do not track the user's navigation at the additional merchant sites that the user may decide to visit. Finally, they do not track a user's item selections during a session, including those selections made while navigating a merchant's site.

There is a need for a shopping or search site that allows a user to view all or substantially all of the items from a site that has items matching a user's search criteria. There is a need for a shopping or search site that provides search results by facilitating transitions between the shopping or search site and multiple merchant sites that may have items matching a user's search criteria. There is a need for a shopping or search site that tracks a user's item selections during a session and that tracks not only selections made while navigating the shopping or search site but also while navigating a merchant's site. Finally, there is a need for a shopping or search site that tracks a user's selections at a merchant site to facilitate the user's return to sites visited and items viewed during the session.

SUMMARY OF THE INVENTION

The present invention offers a new and unique method of organizing and displaying web based search engine results and further allowing the user to navigate and select items from the search engine results in a more expedient and efficient manner. After an initial search has been performed, the system and method displays images of web pages for accessing items that match the search criteria. In an example embodiment, the images are displayed in a horizontal row across the user's screen, with each image sized so that the user may review at least some information appearing on the corresponding web page. By selecting the images the user may view the corresponding web pages, or the user may navigate the remainder of the search results by selecting a shift button or by moving the mouse over the image. Various methods for viewing the corresponding web pages may be used. The initial selection of a right shift button shifts each of the images to the left and another image from the search results appears on the right side of the screen in horizontal alignment with the other images. At this point a left shift button appears on the left side of the screen. A selection of the left shift button shifts the images to the right, pushing the rightmost image off of the screen and placing the previously viewed image in the rightmost position. The user may navigate the entire set of search result images by selecting the right or left shift buttons.

If a user sees an image that is believed to contain information of interest, the user may select the image to view the corresponding web page without disrupting the search results. Selecting the image (e.g., by double clicking it) opens a separate window with the corresponding web page. This separate window, referred to as the operational window, is placed in front of the original search results window and formatted to a size that allows the user to view the entire operational window while simultaneously viewing a portion of the original search results window.

The selection of the web page image also results in a display of product or other item images from the related website that match the search criteria. The images appear in a separate portion of the display to facilitate viewing. Alternatively, they may be displayed in a separate window. An identifier for the site from which the images were obtained appears in proximity to the products. The user may select individual products or items from the display and add them to a product history. The user may scroll through the products or items by selecting right and left shift buttons, similar to the ones that are used to view the web pages of the search results.

A search history option in the operational window allows the user to add the web page image to a search history that is maintained independently of the product history. The search history allows the user to record visits to web pages while the product history allows the user to record selections of individual products or items of interest. Selection of an image from the search history redirects the browser to the web page associated with the image while selection of a product from the product/item history redirects the browser to a web page associated with the product such as a product purchase or informational page. The maintenance of the separate search history and product or item history areas allow the user to revisit web sites or pages that were selected during a session as well as specific products or items that were selected during the session.

The present invention provides a more efficient and dynamic display method for viewing and navigating the results of an Internet search. By displaying images of web pages as well as individual items from web sites and by providing right and left shift buttons to scroll through the display areas, the user may easily navigate then entire set of search results. The user is provided with the option of selecting images of web pages and/or products and items without disrupting the searching process. The search and product histories and the ease with which entries may be added to the histories allow the user to quickly and easily return to previously viewed sites or to previously viewed products or items.

BRIEF DESCRIPTION OF THE DRAWINGS

FIG. 1 is an exemplary initial web page for an example embodiment.

FIGS. 3A-3D are additional exemplary search result screens for an example embodiment.

DETAILED DESCRIPTION OF THE INVENTION

Figure 2A:
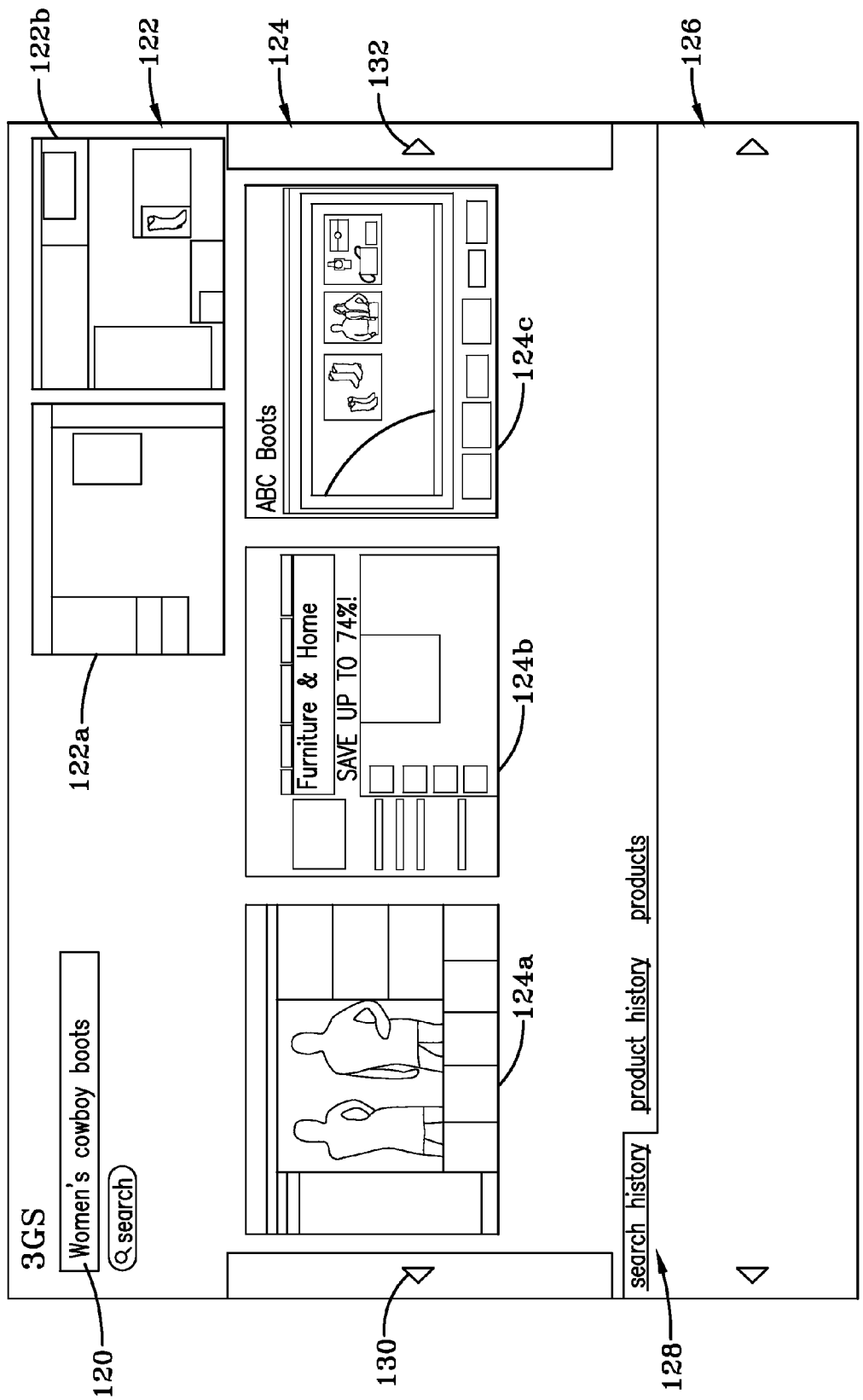
FIGS. 2A-2E are exemplary search result screens for an example embodiment.

The following description details an example embodiment of the present invention. The present invention provides a new system and method for organizing, displaying, and navigating search results. The system and method may be used in conjunction with any type of digital information, but is intended primarily to be used for the purpose of displaying the results of an Internet based search engine.

For the purposes of describing an example embodiment, a search engine is assumed to provide a sequence of multiple relevant web pages in response to a search request for a product. Although the features and functionality of the present invention are described in relation to a product search, search results for any type of product, item, or information may be navigated. For further purposes of this description, this sequence of web pages responsive to the search criteria is referred to as the primary search results.

In an example embodiment, a user first visits a website to enter one or more search terms. An exemplary initial web page is shown in FIG. 1. Upon visiting the web page, the user is presented with a text box 100. The user enters search terms into the text box 100, and upon selecting a search option 102, the search engine generates the primary search results. Identifying data for web pages that match the user's search criteria is provided by the search engine to facilitate display of the search results. For example, image data, URL data, meta-tag data, content data, etc. may be provided in the search results.

There are several means by which the primary search results may be generated. However, in the example embodiment the search results are generated by the following method. Search items returned are found by the keywords which the user enters and are returned in the following order: conjoined search words found in the site description, top-level categories that match the search words, meta-tags (site keywords) that match the search words, any search words found within the site description, and URL titles that contain any of the search words.

The search engine gives first priority to conjoined search words which are found in the site description. A search using the search terms "cars and trucks" first finds web pages that contain the entire string "cars and trucks" together somewhere within the page description. Using PHP, the user input is compared to strings within a MySQL database. The following code may be used:

$sql="select * from searchData where LOWER(site_description) like LOWER(%'$user_input'%)".

The use of the word "LOWER" may be used to convert a string to lower case so the site search is not restricted to only upper case wording.

After first searching for instances of conjoined strings, the search engine gives priority to category searches. Using the previous example, "cars and trucks" may not be a category, but "cars" and "trucks" may be individually categorized in the database. The PHP code parses the string into individual words and completes a word-by-word comparison. The comparison is done by splitting the user string, delimited by spaces, and then cross-referencing the split string with the category section of the search database. So "cars and trucks" becomes "cars," "and," and "trucks."

A program loop is created so that while there are more items in an array, the loop continues. The search engine first checks for "cars" within the category column of the search table. If it is there, it is added to the result. The term "and" is skipped because it is an article. The search engine then searches within the category column of the search table for "trucks." Such a process is repeated for each search term.

The search engine next searches for meta-tags (site keywords) that match the search terms. Most websites use meta-tags in order to describe their sites via keywords. In this process the user string is parsed and the search is conducted for each individual term in the aforementioned manner. The search engine finally searches for any search words found within the site description. These descriptions are searched in the same manner as the meta-tags. Each site has a corresponding site description in the MySQL database in the "siteSearch" column. This text-column is searchable, and it is searched for the search terms. If a match is found, the image for that site is retrieved and "echoed" out into the PHP code. Finally, URL titles that contain any of the search words are located.

The search engine next matches relevant site content from the returned search results for display in a site item area of a secondary results area. One example of the items that may be provided in the site item area are products that are for sale at a site and that correspond to the user's search criteria. Another example is multimedia or video content that match a user's search criteria. This content embedded within the website is searched for in the same manner that returned the main search result list. Content is found by searching and storing meta-tag data, visual images or other useful information (such as price and color if the information is a product) that facilitates determining the most relevant items corresponding to the users' search criteria.

This site item area of the secondary results area may replace a history of user selected search results area from the main result list. It may also be displayed alongside the user selected search results area, on top of the user selected search results area by using tabs that allow the user to navigate between the site item and selected search results areas or other means by which the user can toggle between the two areas.

A third item history area of the secondary results area may comprise relevant site content created as a result of the user selecting items from the site item area. The user may identify items for the item history area by selecting an image or multimedia reference, by selecting an icon associated with the item such as a plus sign, or by other means that allow the user to indicate a preference for the item. The item is then duplicated in a third item history area that may also be displayed alongside of the site item area or selected search results area, on top of the other secondary areas by using tabs that allow the user to navigate between the two secondary areas or other means by which the user can toggle between the two areas. The third item history area comprises items selected from the site item area.

In an example embodiment, when the search is conducted, the search engine returns a result for each of five search criteria columns. Each individual result is either true if there is a match, or null if there is no match. Results are sent to searchPage.php, which contains MySQL code to call to a database comprising images for the web pages. If there is a match, the URL and image file for the result are returned and echoed to the PHP code as follows:
    MySQL statement="select * from searchTable where siteDescriptioin='$userInput'";
    If(MySQL)// if there is a result, do something
    {$imageFile=$row['imageFile']; $url=$row['url']; // now echo this info out echo("&imageFile=$imageFile&"); // the ampersands are there so flash can spot them and pull the resulting image file and url in}

Flash is designed to read external file variables starting with the ampersand. "$imageFile" is a PHP variable, so if the image file from the SQL database equals "images/mytruckPic.gif", then $imageFile="images/mytruck.gif". So, using the above example, the actual searchPage.php would look in a browser like "&imageFile=images/mytruckPic.gif." This result is triggered by the user inputting text into the search field on the flash page. The flash page, when the submit or search activation button is selected, then posts the user submitted data to the searchPage.php. The resulting searchPage.php is read back into flash in order to create the picture array that the user sees as a URL preview. Flash uses the following code to pick up the image names from the PHP:
for (i=0; i<10; i++) {
    urlSite=eval("_root.urlVar"+i);
    urlImage=eval("_root.imageVar"+i);
    urlTitle=eval("_root.titleVar"+i);
    loadMovie(urlImage, "scroll.result01.loader");
    _root.urlTest.text=urlImage;
}
function loadURL ( ) {
    getURL(_root.resultLoader.urlSite, "_blank");
}
stop( );

Now that flash has the resulting images from the PHP, it can display the images onto the interface screen.

Upon execution of the search, the user is presented with a search results screen, as shown in FIG. 2A. In an example embodiment, the search results screen comprises a new search section 120, a results section 124, an advertisement section 122 and a secondary results area comprising a history and expanded results section 126 with multiple tabs for accessing a search history, a product or item history, and an expanded products or items area 128. Alternatively, the secondary results may be displayed in a separate window or in a separate page. The new search segment 120 comprises a text box and a search activation button. At any time during a session, the user may enter new search terms into the text box and activate a new search by selecting the search activation option. If a new search is conducted at any time, the search results section 124 is updated with the new search results.

The advertisement section 122 of the search results screen, in an example embodiment, contains two separate advertisements 122a and 122b aligned horizontally in the upper right hand portion of the browser window. The individual advertisements 122a and 122b may consist of any content, but are generally targeted to the search criteria entered by the user. If the user selects one of the advertisements 122a or 122b, the browser is redirected to the web page shown in the advertisement.

The search results section 124 of the search results screen may cover a larger portion of the screen than the other sections to facilitate the user's viewing of the results. Alternatively, the primary search results section may cover the entire screen and the secondary results area may be displayed on a separate screen. A primary search results set comprises a plurality of web page images that comprise content or access to content matching the search criteria. As shown in FIG. 2A, the primary search results are displayed in the results section in image form 124a, 124b, and 124c with each image 124a, 124b, and 124c representing an individual web page from the primary search results. When the search results are presented, the results section 124 of the search results screen initially displays images 124a, 124b, and 124c aligned horizontally, as shown in FIG. 2A in a row in the middle of the screen 124. A lower section of the screen 126 may be reserved for displaying additional information related to the search results. Alternatively, the additional or secondary results may be displayed on a different screen (e.g., in a separate window or on a separate page). The additional information may be organized in a plurality of tabs 128 that identify the informational area (e.g., search history, product or item history, and site products or items) displayed on the screen 126.

Figure 2B:
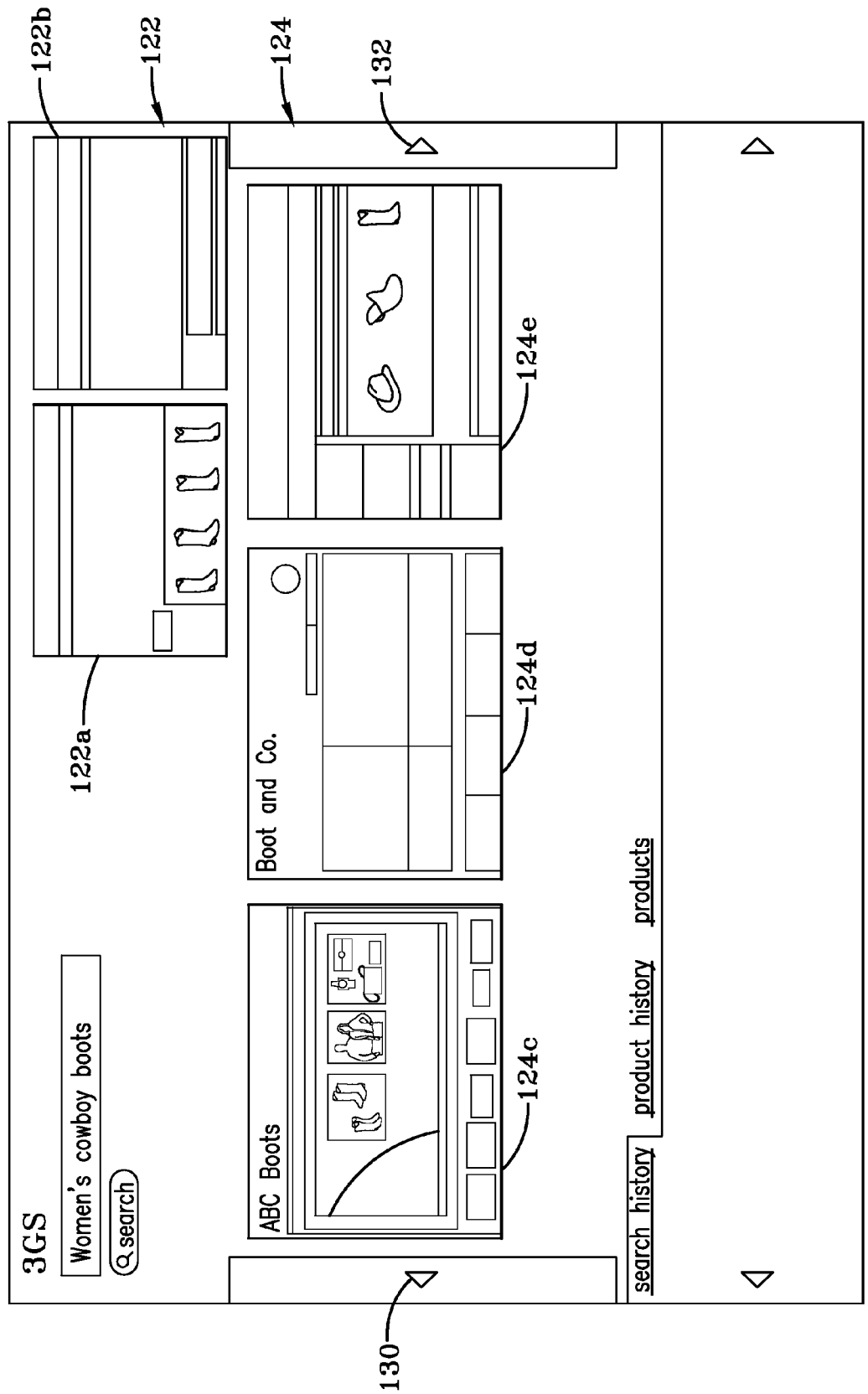

A scrolling function implemented with left shift 130 and right shift 132 buttons may be used to view the individual data segments of the primary data set. Left 130 and right 132 shift buttons facilitate viewing of the images that are aligned horizontally. Selection of the right shift button 132 causes each of the images to shift one position to the left. Results of selecting the right 132 shift button twice are shown in connection with FIG. 2B. The image that was displayed previously in the far right position is displayed in the far left position 124c and two additional images are added to the display, one in the center position 124d and one in the far right position 124e. Further selections of the right 132 shift button cause the leftmost image 124d to shift off of the screen, the center 124d and rightmost 124e images to shift to the leftmost and central positions, respectively, and a new image to appear in the rightmost position. As the user continues to select the right shift 132 button, the leftmost image is shifted off the screen and a new image is placed in the rightmost position.

The left 130 shift button may be dimmed until the point that the first image is shifted off the left side of the screen. The left 130 shift button may then be highlighted indicating that the user can select it. If the user selects the left 130 shift button, the rightmost image 124e is shifted off the screen to the right, the center 124d and leftmost 124c images are shifted to the rightmost and center positions, respectively, and the last image to be shifted off the left hand side of the screen appears in the leftmost position. Thus, by using the right shift 132 and left shift 132 buttons, the user may navigate the images 124 of the primary search results.

The individual advertisements 122a, 122b appearing in the advertisement section 122 may update simultaneously with the search results 124. For example, every time the user selects the right shift button 132 to move the search result list one image to the left, the advertisement images may change. The advertisements 122 may be drawn from a separate table similar to one used to store the horizontal search results list 124.

In order to facilitate the user's ability to quickly and efficiently navigate the images 124, the web browser loads more results than are shown on the screen. After conducting an initial search, the web browser may download approximately 20 images, while displaying only a subset (e.g., the first three). As the user shifts the images 124 to the left, the browser maintains a threshold number of images to the right and to the left of the displayed images. As more and more images are shifted to the left, images to the far right are replaced and new images are downloaded.

The advantage of providing result shift buttons is that it allows the user to quickly browse the images 124 of the primary search results. Images to the right or left of the screen may easily be shifted on the screen while the browser downloads the replacement the images to the right or left of the display area. Any number of images may be maintained for scrolling, and the optimal number of images depends on the memory of the web browser, the download speed, and the size of the images.

Figure 2C:
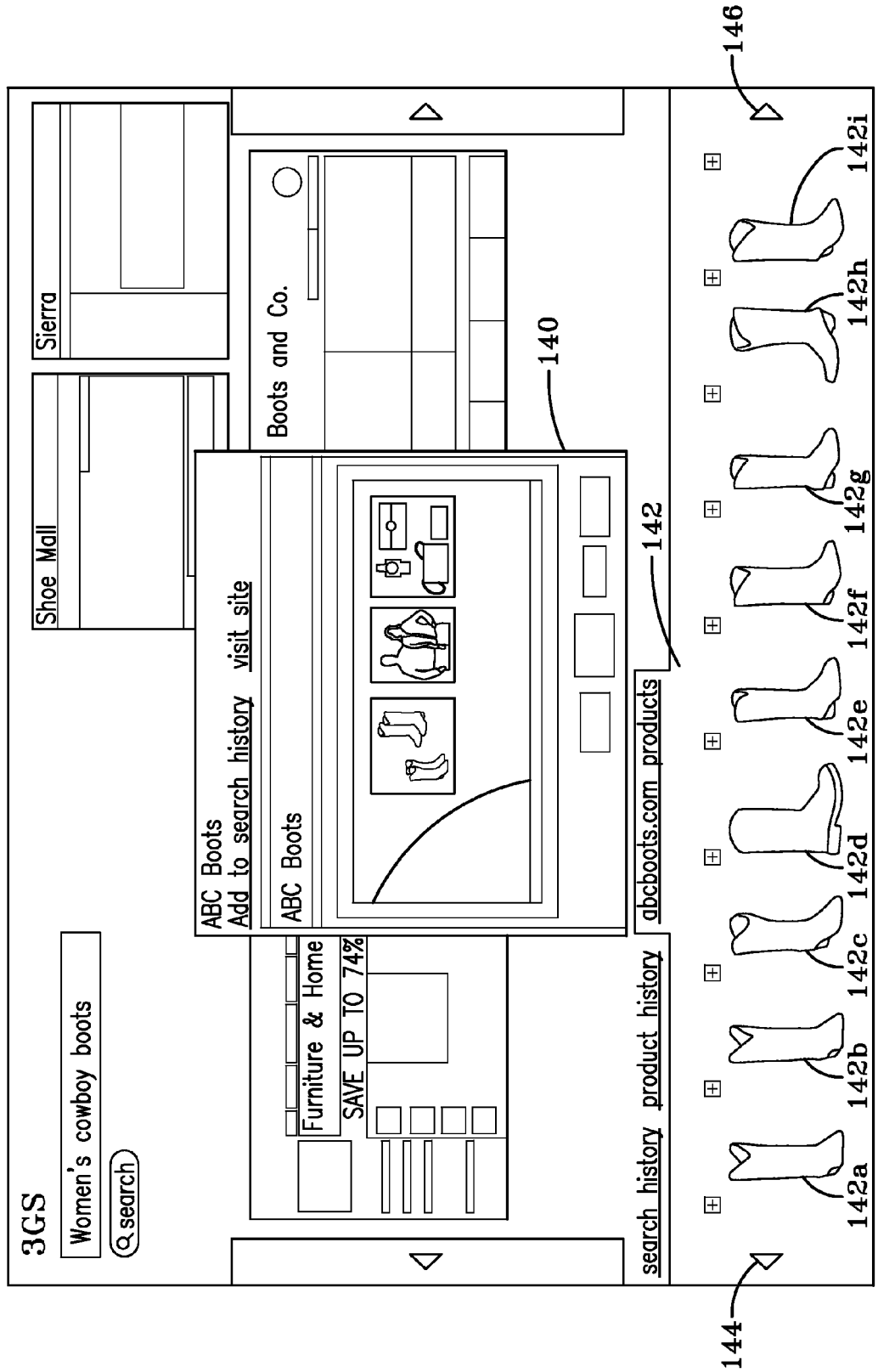

The user may browse the entire set of primary search results by using the right shift 132 and left shift 130 buttons. When the user sees an image that is of interest, he may select the image and view a larger version of the web page by selecting the image (e.g., by double clicking on it). For example, when the user selects the image 124c (e.g., by double clicking on it), the corresponding web page is displayed in a new window as shown in FIG. 2C. The new window 140, which is referred to as the operational window, may be opened to a size that allows the page to be viewed but also allows the user access to the original search window as shown in FIG. 2C.

The link to the web page from the primary search results is used to open the operational window. The operational window 140 allows the user to explore secondary information at each of the web pages in the primary search results. In addition to displaying the web page in an operational window, products that are accessible from the web site associated with the web page and that match the user's search criteria are displayed in a site products area of the screen 142. The site products are displayed as images 142a 142b 142c 142e 142f 142g 142h 142i in a horizontal row 142 with left shift 144 and right shift 146 buttons. The user may scroll through the products in the site product or item area 142 using the left shift 144 and right shift 146 buttons. Images move to the right or left in the same manner that web page images move to the right or left in the search results area.

Products or other site items in the site item area 142 may be located by crawling the site, locating images relevant to the search criteria, and storing the image data to facilitate the features and functionality of the site item area. Information associated with the images such as meta-tag data, price, size, color, style etc. may also be stored and then used to create a search result list of the images for display in the site item area.

Figure 2D:
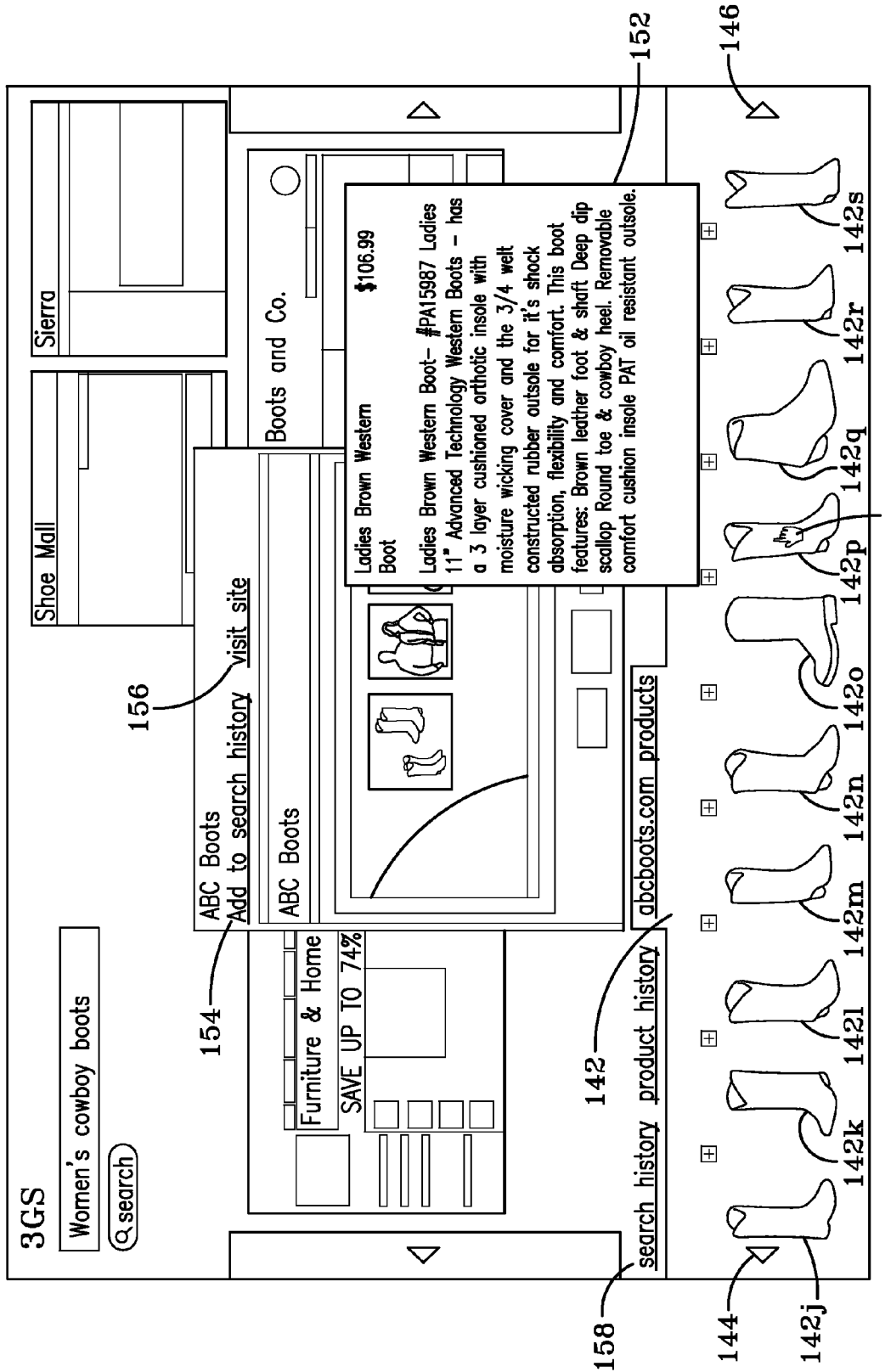
Figure 2E:
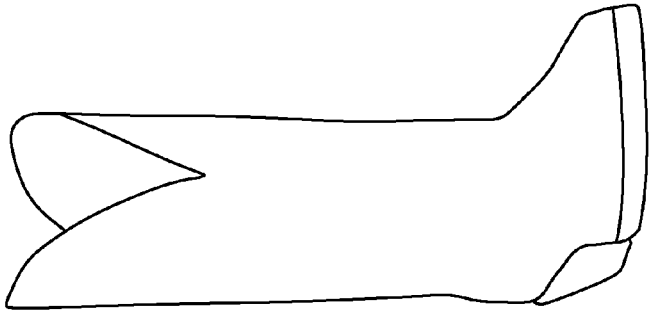

Several features in the site product or item area facilitate the user's review of a product or other item. Referring to FIG. 2D, when the user mouses over 150 an image 142p in the site item area 142, additional details for the item are displayed in a popup window 152. The details shown in the window 152 may be obtained from a product purchase or other informational page for the product or item. The user may further select any one of the products or items in the site product or item area to access a web page associated with the product or item as shown in FIG. 2E. Depending on the organization of the pages at the associated web site, each item in the site product or item area may have its own purchase or informational page that the user can view. The site item area allows the user to view items at the site that match the search criteria and to obtain additional information for specific products or items of interest.

Referring again to FIG. 2D, the operational window has other options that facilitate the user's interaction with the search results. The operational window has an "add to search history" option 154 for recording the page in the search history area 158. Selection of the option causes the selected page to be added to the search history area. Alternatively, pages may be added automatically to the area as they are selected for viewing rather than in response to the user's selection of the "add to search history" option. The operational window also has a "visit site" option 156 for navigating to the web site associated with the web page displayed in the operational window. Alternatively, the user may simply select (e.g., by double clicking) the window to visit the associated site.

Figure 3A:
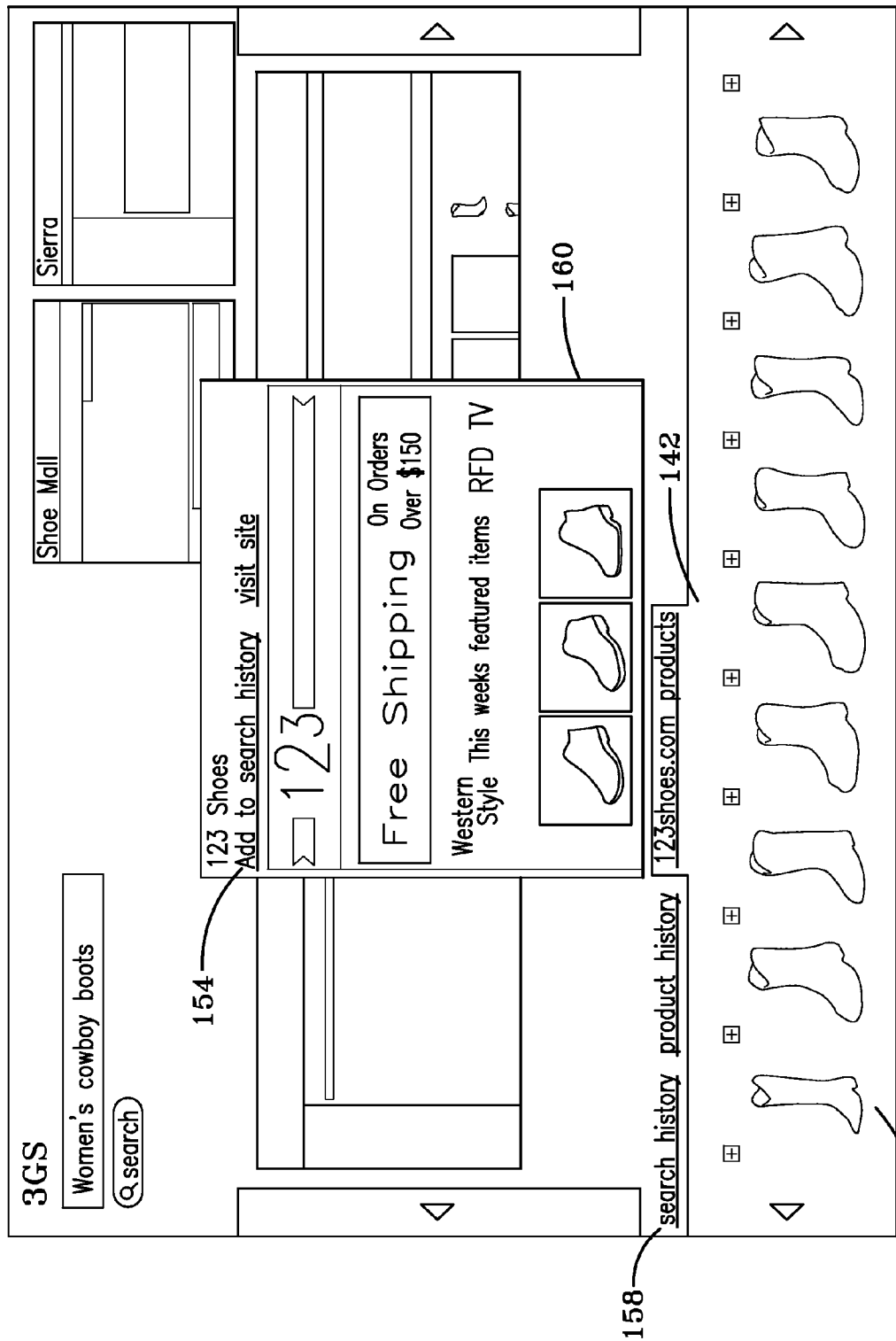
Figure 3B:
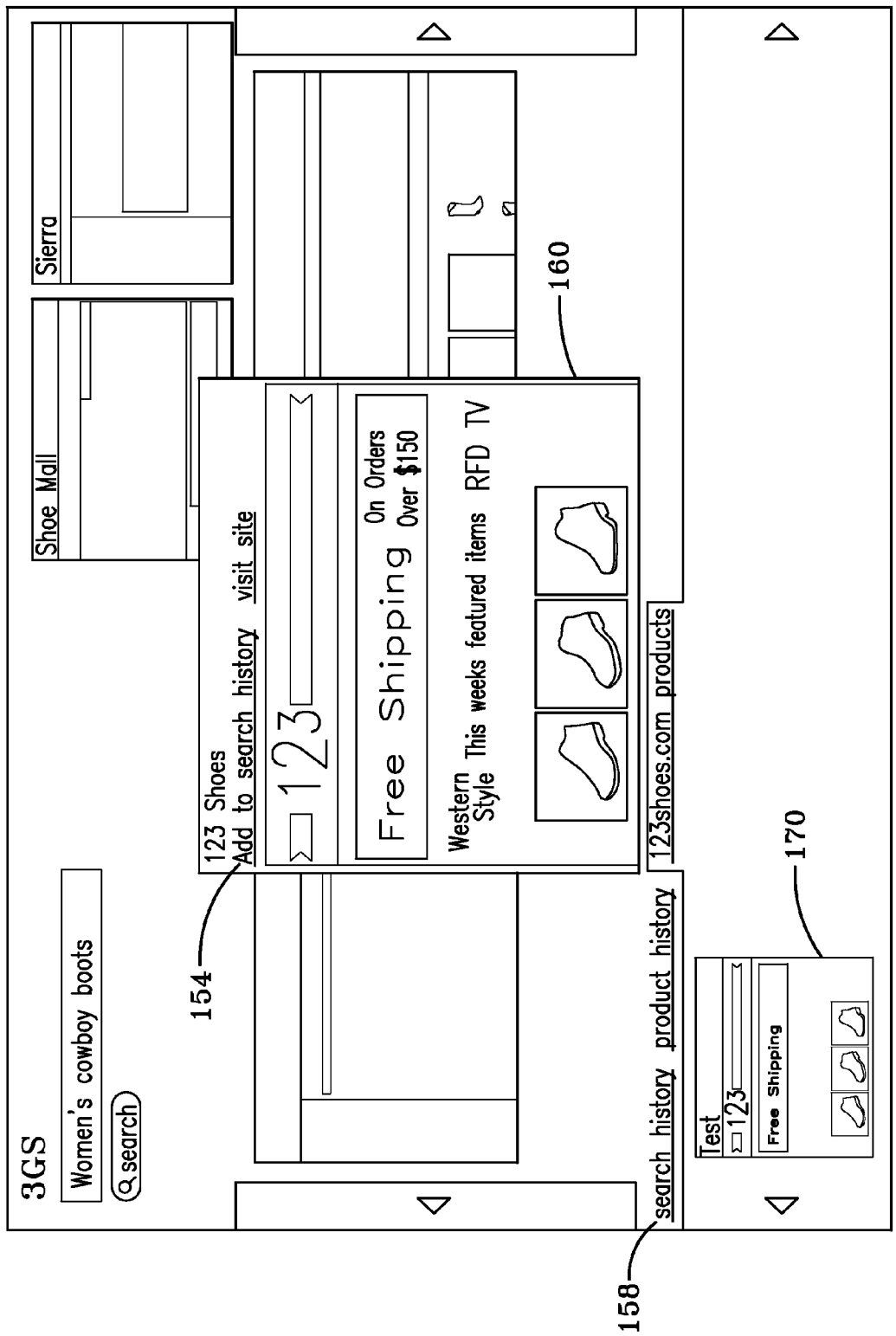

Referring to FIG. 3A, a second example operational window 160 and related site item area 142 are shown. As indicated previously the user may select an "add to search history" option 154 to record the page in the search history area 158. Referring to FIG. 3B, an example search history is shown. Following selection of the "add to search history" option for a web page displayed in the operational window, an image of the web page 170 is recorded in the search history area 158 to facilitate the user's return to the associated web site.

Figure 3C:
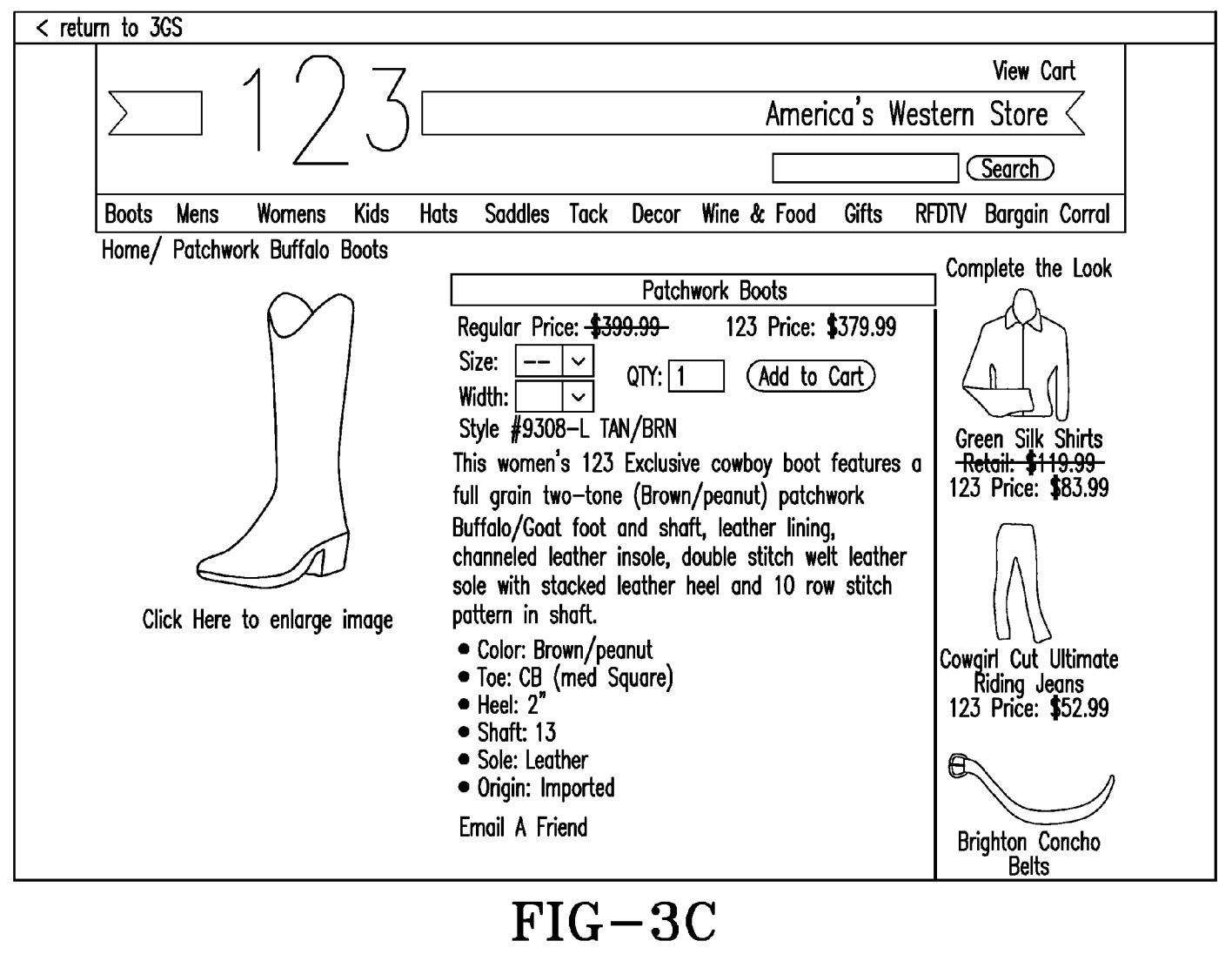

Referring again to FIG. 3A, the user may select a product 162 from the site product or item area 142 to view a purchase or information page as shown in FIG. 3C. The user's selection of the product is then recorded in the product or item history area 180 as shown in FIG. 3D. Each product that user selects from the site product or item area 142 is recorded in the product or item history area 180. The product or item history area 180 assists the user with remembering which specific products or items were of interest as the user navigated the primary search results. The user may revisit pages for previously viewed products or items by selecting them from the history area 180.

The secondary search results area, which include the search history 158, corresponding site products or items, and product or item history 180, may be stored in a temporary database table. When an image is selected from the primary search results or site item area and selected for addition to the search history, the URL and corresponding image is saved into the temporary database table. The URLs and images are then provided to the flash code so that the secondary search results may be displayed and reviewed by the user. The images and URLs of the secondary search results are provided to the flash code in the same manner as the primary search results except the images and URLs are retrieved from a different MySQL table. Therefore, the PHP also holds the code:

MySQLstatement="select * from userTempTable10023408";

where "UserTempTable" is concatenated with a session variable. In the above example, the session number is 10023408, which is a number assigned by the web server. The table "userTempTable+session variable" is created as soon as the website of the present invention is opened.

The table is populated based on the web pages selected from the search results window and selected for addition to the search history area. If the user searches "cars and trucks" and "chevrolet.com" appears in the primary search results and the user selects the corresponding image and "add to search history" option, the "chevrolet.com" image is inserted into the database table.

MySQLstatement="insert into userTempTable10023408
    values('chevrolet.com', 'chevrolet Image.gif')";

The image "chevroletImage.gif" now appears in the history of the secondary search results which may appear below the primary search results or in a separate window. Every subsequent selection of an image from the primary search results that is also selected for addition to the search history area has the same effect, so the secondary search results continue to grow.

By selecting a result from the primary search result, a user may trigger a secondary search that searches within the associated website content pertaining to the users' search criteria. The relevant information is then displayed in the secondary results area that may be displayed on the same page as the primary search results or on another page. The user may switch between history (e.g., search and item) and site item areas in the secondary results area by using tabs that allow the user to navigate between the secondary results areas or other means by which the user can toggle between the areas.

Figure 4:
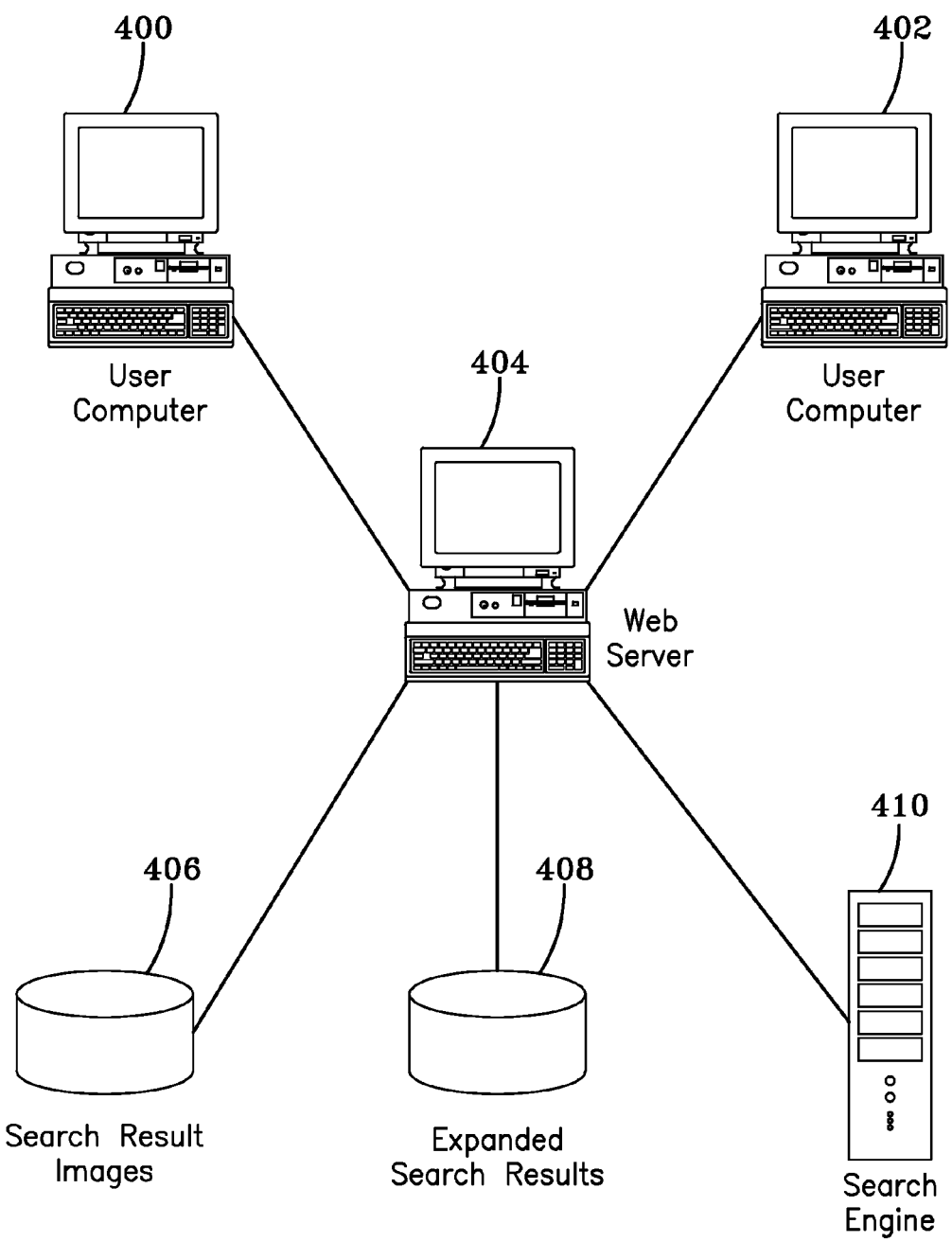
FIG. 4 is a block diagram of the primary components for an example embodiment.

Referring to FIG. 4, the primary components for an example embodiment are shown. The features and functionality may be provided to a plurality of computer users 400, 402 by a web server 404 that obtains on behalf of the computer users 400, 402 search results from a search engine 410. The search engine 410 may be under the control of the web server 404 or it may be operated by a third party that provides the search results to the web server 404. The web server 404 may use the search engine results to locate corresponding web page images that are contained in a database 408 accessible to the web server 404. The web server 404 retrieves the images from the database 408 in order to present the search engine results to the user computers 400, 402 in accordance with the features and functionality of the present invention. A secondary search results database 406 may be used to temporarily store secondary search results for computer users such as the search and product or item histories as well as site items for expanded search results. Alternatively, the secondary search results may be stored locally at each user computer 400, 402.

Although the example embodiment of the present invention is to be used in conjunction with a product or commercial goods search engine, other embodiments are possible. In fact, the present invention could be used to navigate any type of digital information. For example, the computerized system and method may be used to view news stories and headlines. For this embodiment the primary data set, analogous to the primary search results of the example embodiment, consists of a variety of news publications, each of which may have numerous articles. When a publication from the primary data set is selected, an operational window appears from which specific news articles may be accessed. Specific articles from the selected publication may be used to populate the site item area. The publications that are accessed from the primary search results may be used to populate the search history area while the specific articles at a site that are accessed may be used to populate the item history area.

The present invention may also be used in conjunction with encyclopedic information in a similar manner. Web pages relevant to the search criteria comprise the primary data set while specific informational items at the related sites could be used to populate the site item area. The user may explore the web pages as well as specific items in the site item area. The search history and item history areas may then be populated based on the user's selections.

While example embodiments of the invention have been illustrated and described, various modifications and combinations can be made without departing from the spirit and scope of the invention. For example, the presentation of images from the primary results area and secondary results area may occur on a single screen display or across screen displays. In addition, web pages and items contained in the secondary search results may be arranged in a variety of ways on a single or multiple screens. Modifications, combinations, and equivalents to the system and method of the present invention are intended to be covered and claimed.

The invention claimed is:

1. A method, comprising:
receiving, at a web server, identifying data for a plurality of web pages in response to a search request;
transmitting, from the web server, a plurality of web images corresponding to the plurality of web pages, at least a portion of the plurality of web images displaying on a first section of a first window;
receiving, at the web server, a selection of at least one web image corresponding to at least one of the plurality of web pages;
locating a plurality of items at a web site associated with the at least one web image in response to the selection;
transmitting, from the web server, the plurality of items for display on a second section of the first window substantially simultaneously with a display of the web site associated with the at least one web image corresponding to the at least one of the plurality of web pages on a second window;

transmitting, from the web server, an advertisement associated with the plurality of web pages for display on a third section of the first window in response to the selection of the at least one web page corresponding to the at least one of the plurality of web pages; and periodically transmitting, from the web server, an updated advertisement associated with the plurality of web pages for replacing the display of the advertisement on the third section of the first window in response to receiving an activation of a scroll button;

wherein each of the plurality of web pages comprises content from products, multimedia content, images, or publications;

wherein the first section of the first window comprises the scroll button configured to scroll the display of the plurality of web images on the first section of the first window;

wherein the second section of the first window comprises a first tab configured to display the plurality of items; and wherein the second section of the first window comprises a second tab configured to display a search history; and wherein the second section of the first window comprises a third tab configured to display a product history.

2. The method of claim 1, wherein the plurality of items at the web site associated with the at least one of the plurality of web pages include products, multimedia content, images, or publications.

3. The method of claim 1, wherein transmitting, from the web server, the plurality of items comprises transmitting, from the web server, item images of the plurality of items for display in a site item area.

4. The method of claim 3, wherein the site item area appears on a window that is different from the first window.

5. The method of claim 1, further comprising:
receiving, at the web server, a selection of at least one of the plurality of items; and
transmitting, from the web server, additional information associated with the at least one of the plurality of items based on the selection of the least one of the plurality of items;
wherein the additional information associated with the at least one of the plurality of items is displayed on a third window substantially simultaneously with the display of the web site associated with the at least one of the plurality of web pages on the second window.

6. The method of claim 5, further comprising receiving, at the web server, an indication to add the at least one of the plurality of items to an item history area displayed on a second tab in the second section of the first window.

7. The method of claim 1, further comprising transmitting, from the web server, a plurality of web pages having advertising content.

8. The method of claim 7, further comprising transmitting advertising content in response to the selection of the at least one web image corresponding to at least one of the plurality of web pages.

9. The method of claim 7, further comprising transmitting, from the web server, a plurality of advertising web pages for advertising content in response to the search request.

10. The method of claim 9, further comprising transmitting, from the web server, different web pages for advertising content selected in response to navigation of the images of the plurality of web pages.

11. A method, comprising:
receiving, at a web server, identifying data for a plurality of web pages in response to a search request;
transmitting, from the web server, a plurality of web images corresponding to the plurality of web pages, at least a portion of the plurality of web images displaying on a first section of a first window;
receiving, at the web server, a selection of at least one web image corresponding to at least one of the plurality of web pages;
locating a plurality of items at a web site associated with the at least one web image in response to the selection;
transmitting, from the web server, the plurality of items for display on a second section of the first window substantially simultaneously with a display of the web site associated with the at least one web image corresponding to the at least one of the plurality of web pages on a second window;
transmitting, from the web server, an advertisement associated with the plurality of web pages for display on a third section of the first window in response to the selection of the at least one web image corresponding to the at least one of the plurality of web pages; and
periodically transmitting, from the web server, an updated advertisement associated with the plurality of web pages for replacing the display of the advertisement on the third section of the first window in response to receiving an activation of a scroll button;
wherein each of the plurality of web pages comprises content from products, multimedia content, images, or publications;
wherein the first section of the first window comprises the scroll button configured to scroll the display of the plurality of web images on the first section of the first window;
wherein the second section of the first window comprises a first tab configured to display the plurality of items;
wherein the second section of the first window comprises a second tab configured to display a search history; and
wherein the second section of the first window comprises a third tab configured to display a product history.

12. The method of claim 11, further comprising receiving, at the web server, an option to navigate to a web based at least in part on the selection of the at least one web image corresponding to the at least one of the plurality of web pages.

13. A method, comprising:
receiving, at a web server, identifying data for a plurality of web pages in response to a search request;
transmitting the plurality of web pages, at least a portion of the plurality of web pages displaying on a first section of a first window;
receiving, at the web server, an indication of a selection of at least one web page;
locating a plurality of items corresponding to the at least one web page in response to the indication of the selection of the at least one web page;
transmitting, from the web server, at least one image corresponding to at least one of the plurality of items for display on a second section of the first window substantially simultaneously with a display of the at least one web page on a second window;
transmitting, from the web server, an advertisement associated with the plurality of web pages for display on a third section of the first window in response to the indication of the selection of the at least one web; and
periodically transmitting, from the web server, an updated advertisement associated with the plurality of web pages for replacing the display of the advertisement on the third section of the first window in response to receiving an activation of a scroll button;

wherein each of the plurality of web pages comprises content from products, multimedia content, images, or publications;

wherein the first section of the first window comprises the scroll button configured to scroll the display of the plurality of web images on the first section of the first window; and wherein the second section of the first window comprises a first tab configured to display the plurality of items, a second tab configured to display an item history, and a third tab configured to display a product history.

14. The method of claim 13, wherein the plurality of items include at least one of products, multimedia content, images, or publications.

15. The method of claim 13, wherein transmitting, from the web server, at least one image associated with the at least one of the plurality of items includes transmitting the at least one image associated with the at least one of the plurality of items for display in a site item area in the second section of the first window.

16. The method of claim 15, wherein the site item area appears on a screen that is configured to display the images of the plurality of web pages.

17. The method of claim 15, wherein the site item area appears on a screen that is independent of a screen configured to display the images of the plurality of web pages.

18. The method of claim 13, further comprising receiving, at the web server, an option to navigate to a web site associated with the selection of the at least one web page.

19. The method of claim 13, further comprising:
receiving, at the web server, an indication of a selection of the at least one image associated with the at least one of the plurality of items from the second tab displayed in the second section of the first window; and
transmitting, from the web server, additional information associated with the at least one of the images of the at least one of the plurality of items in response to locating the additional information on a website associated with at the at least one of the images of the at least one of the plurality of items.

20. A server, comprising:
one or more processors;
a memory device configured to store instructions;
a processing device configured to execute the instructions stored in the memory device to:
identify a plurality of web pages in response to a search request;
transmit web page images of the plurality of web pages for display in a first section of a first window;
receive a selection of at least one web page image corresponding to at least one web page;
locate a plurality of items at a web site identified in response to receiving the selection of the at least one web page image corresponding to at least one web page;
transmit item images of the plurality of items for display in a second section of the first window substantially simultaneously with a display of the at least one web page in a second window;
transmit an advertisement associated with the plurality of web pages for display on a third section of the first window in response to the selection of the at least one web page image; and
periodically transmit an updated advertisement associated with the plurality of web pages for replacing the display of the advertisement on the third section of the first window in response to receiving an activation of a scroll button;
wherein each of the plurality of web pages comprises content from products, multimedia content, images, or publications;
wherein the first section of the first window comprises the scroll button configured to scroll the display of the web page images on the first section of the first window;
wherein the second section of the first window comprises a first tab configured to display the item images;
wherein the second section of the first window comprises a second tab configured to display a search history; and
wherein the second section of the first window comprises a third tab configured to display a product history.

21. The server of claim 20, wherein the plurality of items comprises products, multimedia content, or publications.

22. The server of claim 20, wherein the item images are displayed in a site item area.

23. The server of claim 20, wherein the processing device is further configured to transmit a plurality of web pages having advertising content for display on a third section of the first window substantially simultaneously with the display of the web page images in the first section of the first window.

24. The server of claim 23, wherein the processing device is further configured to periodically transmit different web pages including updated advertising content for replacing the display of the plurality of web pages having advertising content on the third section of the first window in response to receiving an activation of a left scroll button or a right scroll button in the first section of the first window.

25. An apparatus, comprising:
one or more processors;
a memory configured to store instructions; and
a processing device configured to execute the instructions stored in the memory to perform operations comprising:
transmitting a search request in response to a search string;
directing a display of a plurality of web page images corresponding to a plurality of web pages received on a first section of a first screen in response to the search request;
transmitting an indication of a selected web page image;
directing a display of a plurality of item images corresponding to a plurality of items associated with the selected web page image on a second section of the first screen substantially simultaneously with the display of the plurality of web page images on the first section of the first screen received in response to the indication of the selected web page image;
directing a display of the selected web page image on a second screen substantially simultaneously with the display of the plurality of item images on the second section of the first screen;
transmitting an advertisement associated with the plurality of web pages for display on a third section of the first screen; and
periodically transmitting an updated advertisement associated with the plurality of web pages for replacing the display of the advertisement on the third section of the first screen in response to receiving an activation of a scroll button;

wherein the first section of the first screen comprises the scroll button configured to scroll the display of the plurality of web page images on the first section of the first screen;

wherein each of the plurality of web pages comprises at least one of text content, multimedia content, image content, video content, or audio content, or combinations thereof;

wherein the second section of the first screen comprises a first tab configured to display the plurality of item images, a second tab configured to display a search history, and a third tab configured to display an item history.

26. The apparatus of claim 25, wherein each of the plurality of items comprises at least one of text content, multimedia content, image content, video content, or audio content, or combinations thereof.

27. The apparatus of claim 25, wherein the operations further comprise directing the display of the plurality of web page images on a different screen than the first screen.

28. The apparatus of claim 25, wherein the operations further comprise directing a display of the selected web page image on the second tab of the first screen.

29. The apparatus of claim 25, wherein the operations further comprise transmitting an option to navigate to a web site associated with the selected web page image.

30. The apparatus of claim 25, wherein the operations further comprise:
transmitting an indication of a selected item image; and
receiving additional information associated with the selected item image in response to the indication of the selected item image.

31. A method, comprising:
transmitting a search request in response to a search string;
displaying a plurality of web page images corresponding to a plurality of web pages received in a first portion of a first screen in response to the search request;
transmitting an indication of a selected web page image; and
displaying a plurality of item images corresponding to a plurality of items associated with the selected web page image in a second portion of the first screen in response to the indication of the selected web page image;
displaying a web page corresponding to the selected web page image in a second screen substantially simultaneously with displaying the plurality of item images on the second portion of the first screen;
displaying an advertisement associated with the plurality of web pages on a third section of the first screen in response to the indication of the selected web page image; and
periodically replacing the display of the advertisement on the third section of the first screen with an updated advertisement associated with the plurality of web pages in response to receiving an activation of a scroll button;
wherein each of the plurality of web pages comprises at least one of text content, multimedia content, image content, video content, or audio content, or combinations thereof;
wherein the first portion of the first screen comprises the scroll button configured to scroll the display of the plurality of web pages on the first portion of the of the first screen one web page image at a time; and
wherein the second portion of the first screen comprises a first tab configured to display the plurality of items, a second tab configured to display a search history; and a third tab configured to display an item history.

32. The method of claim 31, wherein each of the plurality of items comprises at least one of text content, multimedia content, image content, video content, or audio content, or combinations thereof.

33. The method of claim 31, further comprising displaying the plurality of item images in the first tab displayed in the second portion of the first screen.

34. The method of claim 33, further comprising displaying the selected web page image on the second tab in the second portion of the first screen.

35. The method of claim 33, further comprising:
transmitting an indication of a selected item image; and
receiving additional information associated with the selected item image in response to the indication of the selected item image.

36. The method of claim 35, further comprising displaying the selected item image in third tab in the second portion of the first screen.

37. The method of claim 31, further comprising transmitting an option to navigate to a web site associated with the selected web page image.

* * * * *

UNITED STATES PATENT AND TRADEMARK OFFICE
CERTIFICATE OF CORRECTION

| | | |
|---|---|---|
| PATENT NO. | : 8,522,148 B1 | Page 1 of 1 |
| APPLICATION NO. | : 12/619627 | |
| DATED | : August 27, 2013 | |
| INVENTOR(S) | : Pry | |

It is certified that error appears in the above-identified patent and that said Letters Patent is hereby corrected as shown below:

In the Specification

In Column 5, Line 62, delete "siteDescriptioin" and insert -- siteDescription --, therefor.

In the Claims

In Column 11, Line 43, in Claim 5, delete "the least" and insert -- the at least --, therefor.

In Column 12, Line 43, in Claim 12, delete "web" and insert -- web site --, therefor.

In Column 13, Line 43, in Claim 19, delete "at the" and insert -- the --, therefor.

In Column 16, Line 18, in Claim 31, delete "of the of the" and insert -- of the --, therefor.

Signed and Sealed this
Fourth Day of November, 2014

Michelle K. Lee
*Deputy Director of the United States Patent and Trademark Office*